United States Patent
Iida

(10) Patent No.: US 8,867,053 B2
(45) Date of Patent: Oct. 21, 2014

(54) IMAGE FORMING APPARATUS, CONTROL METHOD, AND PROGRAM

(75) Inventor: Toshihiko Iida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 13/544,820

(22) Filed: Jul. 9, 2012

(65) Prior Publication Data

US 2013/0016383 A1    Jan. 17, 2013

(30) Foreign Application Priority Data

Jul. 15, 2011   (JP) ................................ 2011-156737

(51) Int. Cl.
*G06F 3/12*   (2006.01)
*G06K 15/00*   (2006.01)
*G06K 15/02*   (2006.01)

(52) U.S. Cl.
CPC .......... *G06K 15/005* (2013.01); *G06K 15/4065* (2013.01); *G06K 15/1809* (2013.01); *G06K 15/1823* (2013.01)
USPC ....... 358/1.13; 358/1.15; 358/1.16; 358/1.14; 358/1.17

(58) Field of Classification Search
None
See application file for complete search history.

(56) References Cited

U.S. PATENT DOCUMENTS

| | | | |
|---|---|---|---|
| 7,602,520 B2 * | 10/2009 | Nagahashi | 358/1.16 |
| 8,218,168 B2 * | 7/2012 | Iwata | 358/1.14 |
| 8,253,952 B2 * | 8/2012 | Tsuchitoi | 358/1.14 |
| 8,570,556 B2 * | 10/2013 | Ohashi | 358/1.15 |
| 8,638,464 B2 * | 1/2014 | Kato | 358/1.15 |
| 2008/0144104 A1 * | 6/2008 | Do | 358/1.16 |
| 2010/0110476 A1 * | 5/2010 | Gorgenyi et al. | 358/1.15 |
| 2011/0080614 A1 * | 4/2011 | Sasaki | 358/1.18 |
| 2012/0013932 A1 * | 1/2012 | Gorgenyi et al. | 358/1.13 |
| 2012/0075656 A1 * | 3/2012 | Yasukawa et al. | 358/1.14 |
| 2012/0147399 A1 * | 6/2012 | Uotani et al. | 358/1.9 |

\* cited by examiner

*Primary Examiner* — Satwant Singh

(74) *Attorney, Agent, or Firm* — Canon U.S.A., Inc. IP Division

(57) ABSTRACT

A method is provided for appropriately controlling, if paper information of a paper to be used in printing is not registered, registration of the paper information and the printing process. An image forming apparatus which stores in a storage area, attribute information of a recording medium used in printing analyzes, before printing, print data, determines before printing the print data whether attribute information matching the acquired attribute information is stored in the storage area, and registers in the storage area the acquired attribute information which is not stored in the storage area.

9 Claims, 13 Drawing Sheets

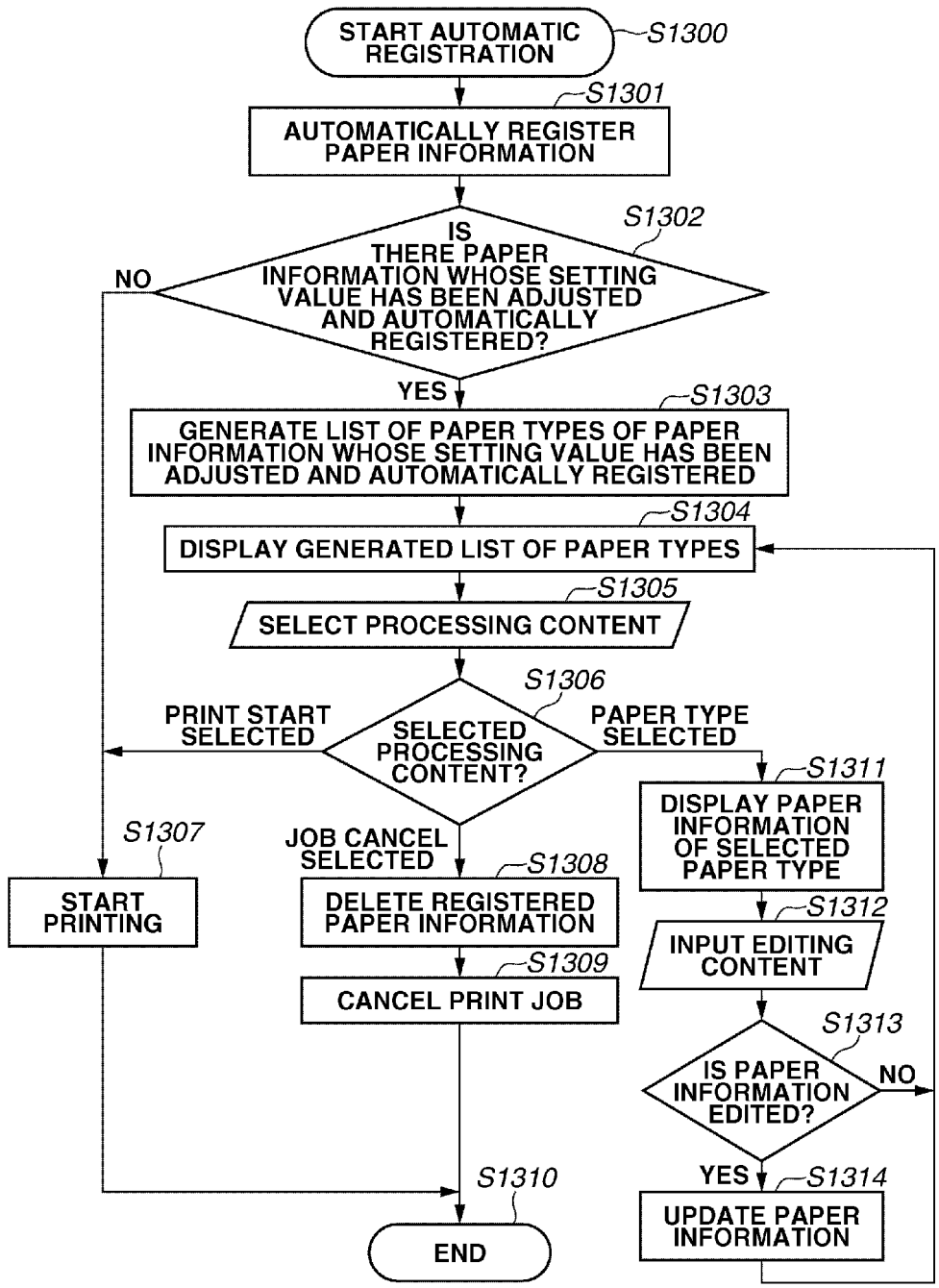

IMAGE FORMING APPARATUS, CONTROL METHOD, AND PROGRAM

BACKGROUND OF THE INVENTION

1. Field of the Invention

The present invention relates to an image forming apparatus, a control method, and a program.

2. Description of the Related Art

A printing apparatus causes a user to register (set), with respect to a paper to be used in printing, paper information including setting values of a plurality of items such as a name, size, mass, shape, and surface property. The user is caused to register the paper information so that the printing apparatus performs printing by applying appropriate print setting information to various types of papers. The printing apparatus employs such setting values when designating the paper to be used in performing printing based on a print job input thereto. In other words, the printing apparatus automatically selects the paper type corresponding to the setting value in the paper information included in the print job.

There is a technique for automatically registering, if the user has not previously registered in the printing apparatus the paper information included in the print job, the paper information in which the setting values are specified. Such a technique registers, when the paper information of the paper type which is not registered in the printing apparatus is to be used, the paper information of the paper type in the printing apparatus. A history of the paper types used by the printing apparatus is thus recorded. As a result, paper management is reinforced, and user-friendliness is improved when printing using the same paper.

In the above-described conventional technique, if the printing apparatus which has started printing is to use the paper of the paper type designated by the paper information in the print job, and then detects that the user has not previously registered the paper information, the printing apparatus performs the following processes. The printing apparatus automatically registers the paper information to be employed, and displays the registered paper information. However, there are problems described below which occur in the conventional technique.

(1) If the paper of the designated paper type cannot be used by the printing apparatus, it becomes necessary to confirm and edit the registered paper information every time automatic registration occurs.
(2) It also becomes necessary to assign the paper of the automatically registered paper type to a tray every time the automatic registration occurs.
(3) It cannot be determined whether the automatic registration occurs with respect to the print job until the printing apparatus starts printing and reaches the stage of using the paper.
(4) If the paper information automatically registered by the print job reaches an upper limit of the number of paper information that can be registered in the printing apparatus, automatic registration cannot be performed. The print job thus becomes cancelled, so that a printed product which has been acquired and operations which have been performed before the job is cancelled becomes wasted.

SUMMARY OF THE INVENTION

The present invention is directed to more appropriately controlling, when the paper information of the paper to be used in printing is not registered, registration of the paper information and the printing process.

According to an aspect of the present invention, an image forming apparatus which stores, in a storage area, attribute information of a recording medium to be used in printing, includes an acquisition unit configured, before printing the print data, to analyze print and to acquire attribute information of a recording medium used in printing the print data, and a control unit configured, before printing the print data, to determine, whether attribute information matching the attribute information acquired by the acquisition unit is stored in the storage area, and to register, in the storage area, attribute information not stored in the storage area among the attribute information acquired by the acquisition unit.

According to another aspect of the present invention, a control method in an image forming apparatus which stores in a storage area, attribute information of a recording medium to be used in printing, includes analyzing, before printing print data, the print data and acquiring attribute information of a recording medium used in printing the print data, and determining, before printing the print data, whether attribute information matching the acquired attribute information stored in the storage area, and registering in the storage area attribute information not stored in the storage area among the acquired attribute information.

According to another aspect of the present invention, a non-transitory computer-readable storage medium storing program for causing a computer to function as a control unit including an acquisition unit configured to analyze, before printing the print data, print data and to acquire attribute information of a recording medium used in printing the print data, and a control unit configured, before printing the print data, to determine whether attribute information matching the attribute information acquired by the acquisition unit is stored in the storage area, and to register, in the storage area, attribute information not stored in the storage area among the attribute information acquired by the acquisition unit.

According to the present invention, if the paper information of the paper to be used in printing has not been registered, the registration of the paper information and the printing can be more appropriately controlled.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is another example of a flowchart illustrating the automatic registration process.

DESCRIPTION OF THE EMBODIMENTS

Various exemplary embodiments, features, and aspects of the invention will be described in detail below with reference to the drawings.

It is to be understood that the invention is not limited to the disclosed exemplary embodiments, and all of the components described in the exemplary embodiments are not necessarily required as means for solving the problems of the present invention.

Figure 1:
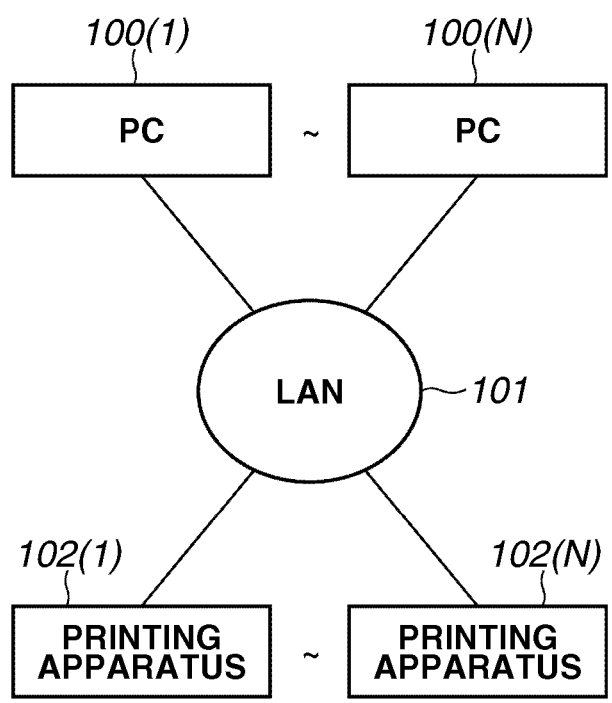
FIG. 1 illustrates an example of a configuration of an image forming system.

FIG. 1 illustrates an example of a configuration of an image forming system according to the present exemplary embodiment. Referring to FIG. 1, the image forming system includes a personal computer (PC) 100 and a printing apparatus 102. The PC 100, such as a personal computer or a work station, is an example of an information processing apparatus (i.e., a computer). The printing apparatus 102 such as a printer or a multifunction peripheral is an example of an image forming apparatus (i.e., a computer). A plurality of PCs 100, i.e., from the PC 100 (1) to the PC 100 (N), are connected via a local area network (LAN) 101 to a plurality of printing apparatuses 102, i.e., from the printing apparatus 102 (1) to the printing apparatus 102(N).

Figure 2:
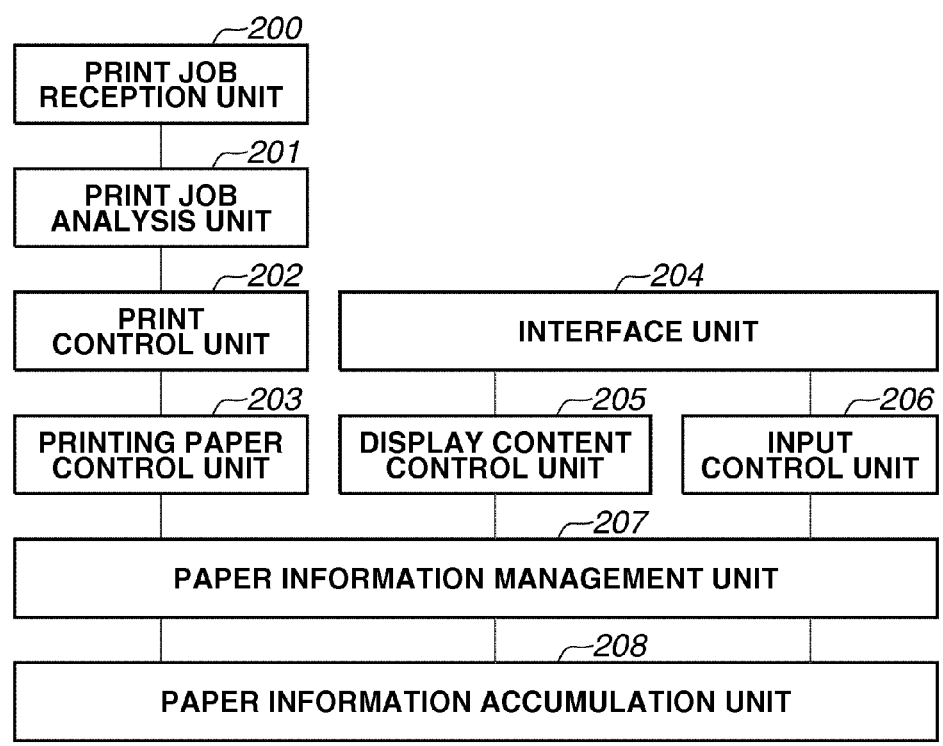
FIG. 2 illustrates an example of a configuration of the printing apparatus.

FIG. 2 illustrates an example of the configuration of the printing apparatus 102 (i.e., module units). According to the present exemplary embodiment, a central processing unit (CPU) in the printing apparatus 102 performs the processes according to a procedure of the programs stored in a storage device such as a hard disk (HD). Functions (i.e., the module units) in the printing apparatus 102 and processes according to the flowcharts to be described below are thus realized. A portion or all of the functions (i.e., the module units) in the printing apparatus 102 and the processes according to flowcharts to be described below may also be realized by dedicated hardware. Further, the programs according to the flowcharts and data necessary for executing the programs are stored in a storage device such as the HD. The CPU in the printing apparatus 102 reads out the programs and the data to a storage device, such as a random access memory (RAM), and executes the programs.

Referring to FIG. 2, a print job reception unit 200 receives the print job (i.e., the print data) transmitted from the PC 100. Upon receiving the print job by the print job reception unit 200, a print job analysis unit 201 then analyzes the received print job. The types of the print job are not limited, and the paper (i.e., an example of the recording medium) to be target for printing is designated by the paper information (i.e., setting values) of the print job. The paper information is at least one setting value, or a combination of a plurality of setting values (i.e., an example of attribute information including the attribute value of the paper, or a combination of the attribute values of the paper). The setting values include the name of the paper, the size, the surface property, a feature, weight, and color.

A print control unit 202 receives the analysis result from the print job analysis unit 201 and determines each of parameters necessary for printing. The parameters to be determined include the information on the paper to be used in printing. The print control unit 202 controls entire printing apparatus 102 (i.e., other module units). A printing paper control unit 203 controls the papers to be actually used in printing. The printing paper control unit 203 which is controlled by the print control unit 202 receives the print job analysis result and determines the paper to be used in performing printing based on the designated paper information.

An interface unit 204 is a user interface (UI) such as a display (i.e., an example of an output device), a keyboard (i.e., an example of an input device), or a touch panel (i.e., an example of an input/output device). For example, the interface unit 204 is an example of a reception unit which receives various operations performed by the user (i.e., user operations). The print control unit 202 issues instructions to the various module units according to the user operation. A display content control unit 205 controls the content to be displayed on the interface unit 204. An input control unit 206 controls the content input to the interface unit 204.

A paper information management unit 207 controls the paper information stored in a paper information storage unit 208. Further, the paper information management unit 207 acquires the paper information from the paper information storage unit 208, deletes and updates the paper information stored in the paper information storage unit 208, and registers the paper information to the paper information storage unit 208. All of the paper information registered in the printing apparatus 102 is stored in the paper information storage unit 208 which is an example of the storage area.

Figure 3:
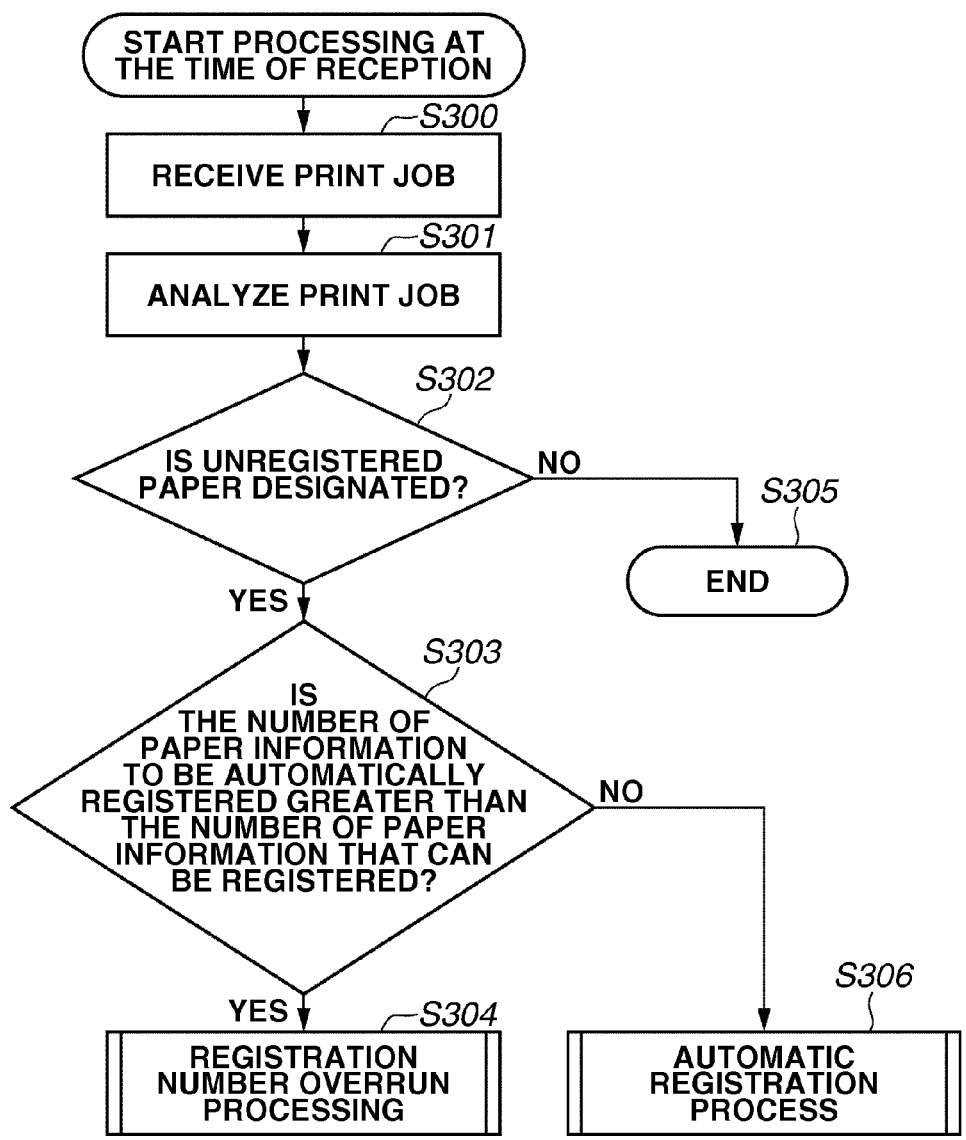
FIG. 3 is an example of a flowchart illustrating processing at the time of reception.

FIG. 3 is an example of a flowchart illustrating a process performed when the print job is input to the print job reception unit 200 (i.e., the processing at the time of reception). In step S300, the print job reception unit 200 receives the print job. In step S301, the print job analysis unit 201 analyzes the received print job. Specifically, the print job analysis unit 201 searches and acquires the paper information to be automatically registered with respect to the received entire print job, and the number of the paper information (i.e., the number of paper types) to be registered.

In step S302, the print control unit 202 determines whether unregistered paper information (i.e., the paper information to be automatically registered) is designated in the print job (i.e., whether the paper information matching the acquired paper information is registered in the paper information storage unit 208). If the print control unit 202 determines that the paper information to be automatically registered is not designated in the print job (NO in step S302), the process ends. In such a case, the printing apparatus prints the print job using the type of paper designated by the registered paper information.

On the other hand, if the print control unit 202 determines that the paper information to be automatically registered is designated in the print job (YES in step S302), the process proceeds to step S303. In step S303, the print control unit 202 determines whether the number of the paper information to be automatically registered (i.e., automatic registration paper number) is greater than the number of paper information that can be registered in the paper information storage unit 208 (i.e., registerable number).

If the print control unit 202 determines that the number of the paper information to be automatically registered is greater than the number of paper information that can be registered in the paper information storage unit 208 (YES in step S303), the process proceeds to step S304, i.e., the registration number overrun processing. If the print control unit 202 determines that the number of the paper information to be automatically registered is less than the number of paper information that can be registered in the paper information storage unit 208 (NO in step S303), the process proceeds to step S306, i.e., an automatic registration process. A plurality of examples of the processes performed in step S304 and step S306 will be describe below, which can be combined and employed as appropriate.

Figure 4:
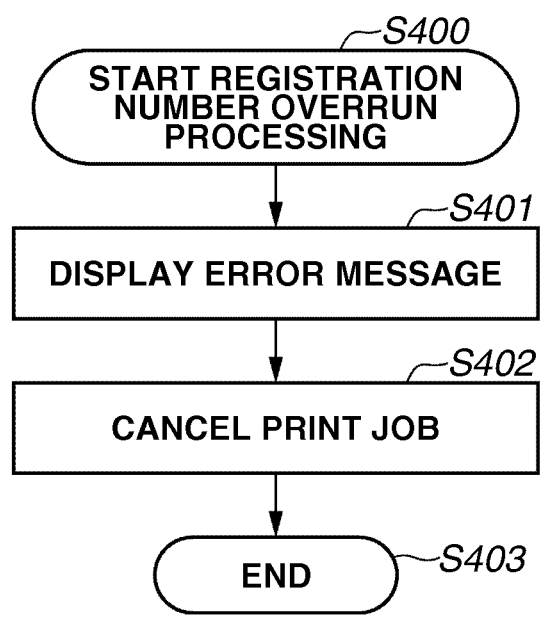
FIG. 4 is an example of a flowchart illustrating registration number overrun processing.
Figure 5:
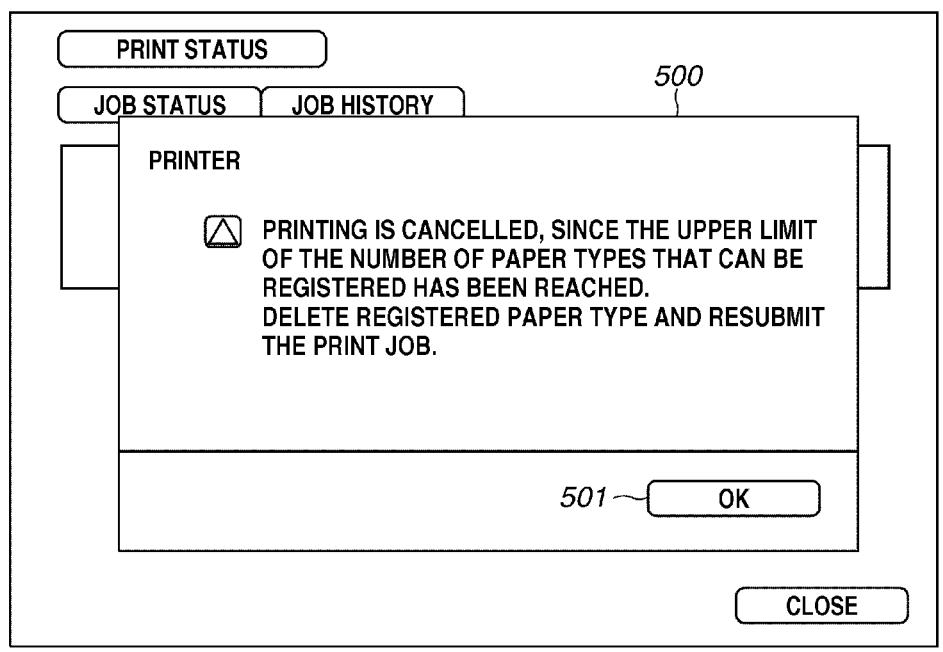
FIG. 5 illustrates an example of an error message.

FIG. 4 is an example of a flowchart illustrating the registration number overrun processing. In step S401, the print control unit 202 displays via the display content control unit 205 an error message on the interface unit 204. In step S402, the print control unit 202 cancels the print job, and the process ends in step S403. The print control unit 202 may notify of the error content by only displaying the error message in step S401. Further, the print control unit 202 may also additionally include the error content in the message such as in a job message format (JMF), or only include the error content in the JMF message. FIG. 5 illustrates an example of the error message displayed in step S401.

FIG. 5 illustrates an example of the error message displayed on the interface unit 204 in step S401 of the flowchart illustrated in FIG. 4. Referring to FIG. 5, a dialog 500 indicates the content of the error message. The content which allows the user to understand that the print job has been cancelled due to the upper limit of the registerable number being reached can be appropriately employed as the content of the error message. An OK button 501 is a UI for confirming that the user has agreed to the content of the error message. If the user presses the OK button 501, the dialog 500 is closed. The dialog 500 may be closed after a predetermined amount of time has elapsed without providing the OK button 501.

Figure 6:
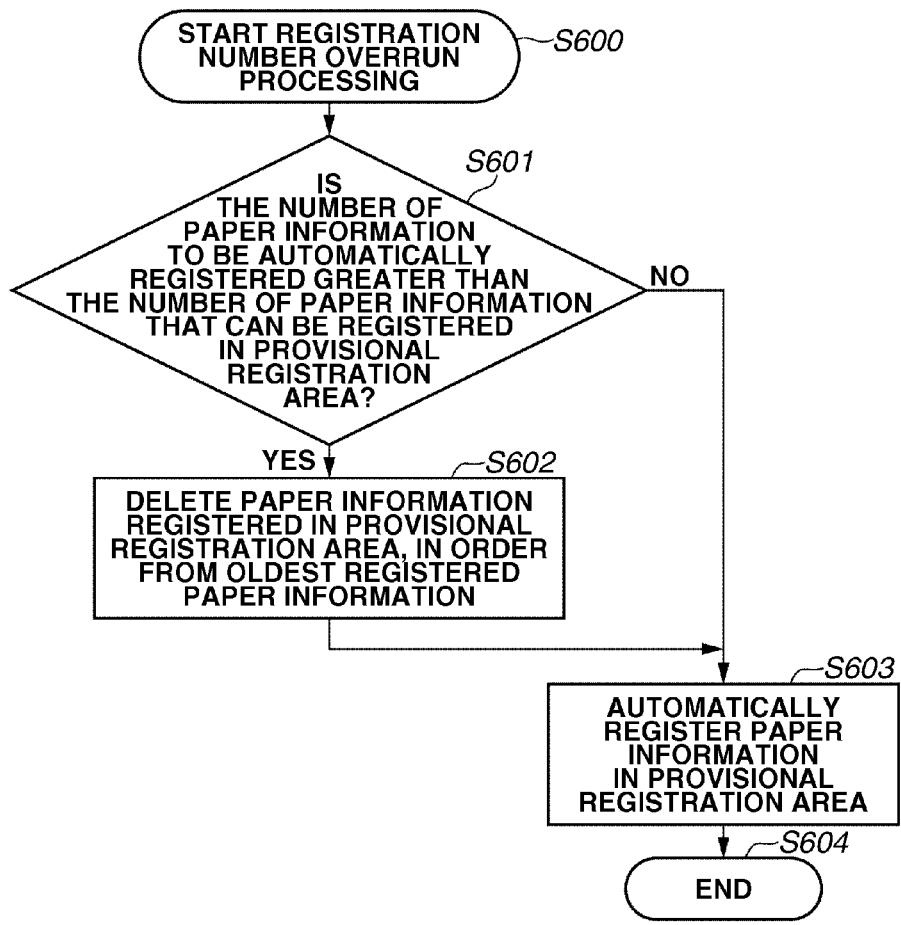
FIG. 6 is another example of a flowchart illustrating the registration number overrun processing

FIG. 6 is another example of a flowchart illustrating the registration number overrun processing. According to the example illustrated in FIG. 6, there is a provisional registration area separate from the registration area used when performing registration according to the normal procedure (process). The registration area and the provisional registration area are examples of the storage areas included in the paper information storage unit 208.

In step S601, the print control unit 202 compares the number of paper information which can be registered in the provisional registration area (i.e., a provisional registration area registerable number) with the number of paper information which is registered with respect to the print job analyzed in step S301 (i.e., the automatic registration paper number). If the number of paper information which can be registered in the provisional registration area is greater (NO in step S601), the process proceeds to step S603. If the number paper information which can be registered in the provisional registration area is smaller (YES in step S601), the process proceeds to step S602.

In step S602, the print control unit 202 deletes, from the paper information registered in the provisional registration area, the number of registered paper information by which the number of paper information to be registered is exceeding. The print control unit 202 deletes the paper information in order from the paper information whose date and time of registration is the oldest. The paper information to be deleted may be determined by the date and time of registration, or by the order of registration. Upon deleting the paper information in step S602, the print control unit 202 causes the process to proceed to step S603. In step S603, the print control unit 202 registers via the paper information management unit 207, the paper information in the paper information storage unit 208 (i.e., automatically registers the paper information in the provisional registration area). The process then ends.

Figure 7:
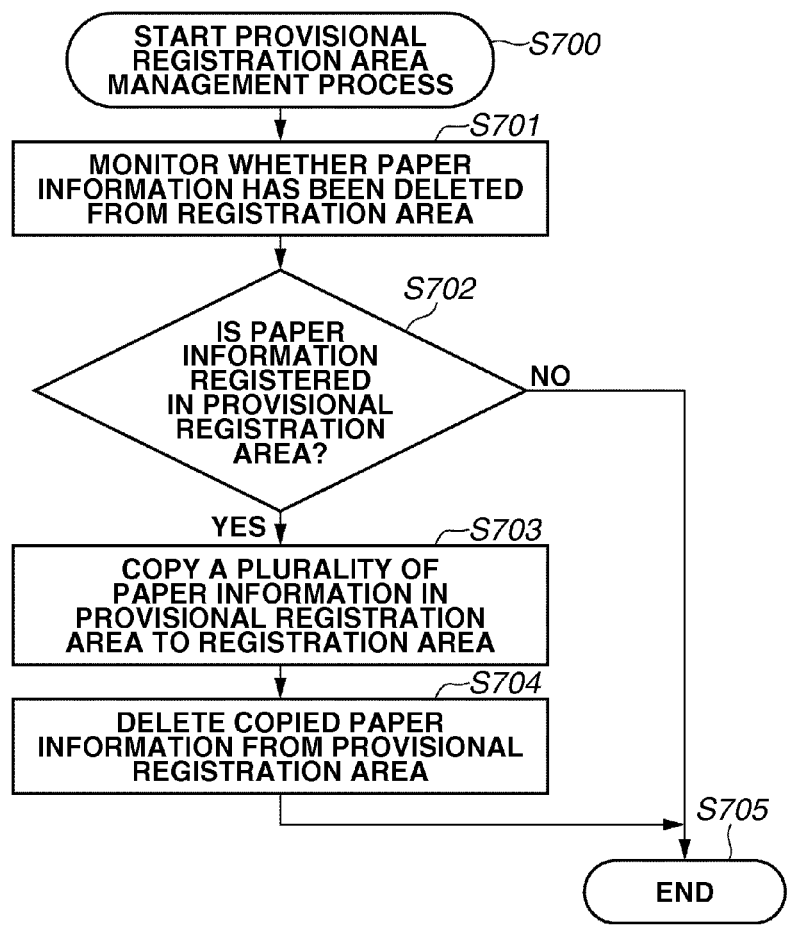
FIG. 7 is an example of a flowchart illustrating a provisional registration area management process.

FIG. 7 is an example of a flowchart illustrating the process performed with respect to the paper information registered in the provisional registration area (i.e., the provisional registration area management process). As described above, in step S602 illustrated in FIG. 6, the paper information registered in the provisional registration area is automatically deleted from the oldest registered paper information with respect to the date and time or the order of registration. In the provisional registration area management process, the paper information in the provisional registration area is then transferred to the normal registration area at appropriate timing.

In step S701, the print control unit 202 identifies (monitors) whether the paper information has been deleted from the registration area. If the print control unit 202 determines that the paper information has been deleted from the registration area, the process proceeds to step S702. If the print control unit 202 determines that the paper information has not been deleted from the registration area, the print control unit 202 continues monitoring.

In step S702, the print control unit 202 determines whether the paper information is registered in the provisional registration area. If the print control unit 202 determines that the paper information is registered in the provisional registration area (YES in step S702), the process proceeds to step S703. On the other hand, if the print control unit 202 determines that the paper information is not registered in the provisional registration area (NO in step S702), the process ends. In step S703, the print control unit 202 copies the paper information registered in the provisional registration area to the registration area, starting from the paper information whose registration date and time is the oldest, or whose order of registration is the oldest. In step S704, the print control unit 202 deletes from the provisional registration area the paper information copied in step S703. The process then ends.

Figure 8:
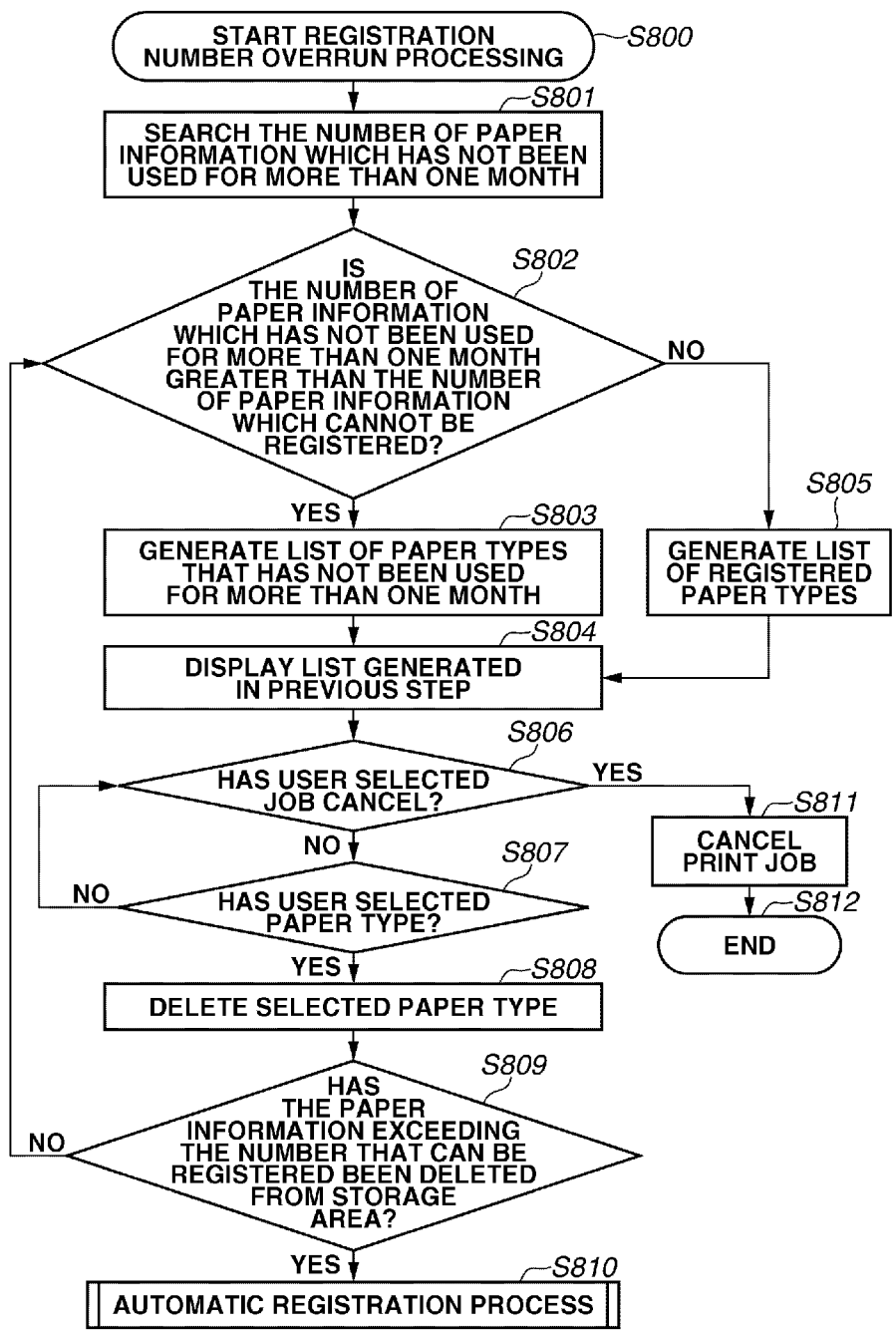
FIG. 8 is another example of a flowchart illustrating the registration number overrun processing.

FIG. 8 is another example of a flowchart illustrating the registration number overrun processing. In step S801, the print control unit 202 searches the number of paper information registered in the paper information storage unit 208 (i.e., an example of a recording area) which has not been used for one month or longer. According to the present example, the print control unit 202 searches for the paper information which has not been used for one month or longer. However, it is not necessary for the length of time to be a fixed value such as one month, and the value may be changeable by the user operating on the interface unit 204 such as the touch panel.

In step S802, the print control unit 202 compares the number of print information which has not been used for one month or longer, determined in step S801, with the number of paper information which has been determined as not registerable (i.e., the number of registration overrun). If the print control unit 202 determines that the number of print information which has not been used for one month or longer is greater (YES in step S802), the print control unit 202 causes the process to proceed to step S803. If the print control unit 202 determines that the number of print information which has not been used for one month or longer is smaller (NO in step S802), the print control unit 202 causes the process to proceed to step S805.

In step S803, the print control unit 202 generates a list of the paper types included in the print information which has not been used for one month or longer. The print control unit 202 causes the process to proceed to step S804. In step S805, the print control unit 202 generates a list of all paper types included in the paper information registered in the registration area. The print control unit 202 causes the process to proceed to step S804. The lists include the information for distinguishing (identifying) the paper type (i.e., identification information), such as the name of the paper type.

In step S804, the print control unit 202 displays on the interface unit 204 via the display content control unit 205 the list of the paper types generated in step S803 or step S805. The interface unit 204 is provided with the buttons for cancelling the print job in addition to displaying the list of the paper types. In step S806, the print control unit 202 determines whether the user has selected cancelling the job. According to the present example illustrated in FIG. 8, the print control unit 202 determines whether the user has pressed the button for cancelling the print job. If the print control unit 202 determines that the user has selected cancelling the job (YES in step S806), the print control unit 202 causes the process to proceed to step S811. If the print control unit 806 determines that the user has not selected cancelling the job (NO in step S806), the print control unit 202 causes the process to proceed to step S807.

In step S807, the print control unit 202 determines whether the user has selected a paper type. If the print control unit 202 determines that the user has selected a paper type (YES in step S807), the print control unit 202 causes the process to proceed to step S808. If the print control unit 202 determines that the user has not selected a paper type (NO in step S807), the print control unit 202 causes the process to return to step S806. In step S808, the print control unit 202 deletes from the paper information storage unit 208, via the paper information management unit 207, the paper information of the selected paper type.

In step S809, the print control unit 202 determines whether the paper information registered in the paper information storage unit 208 has been deleted by the number exceeding the number that can be registered. If the print control unit 202 determines that the paper information registered in the paper information storage unit 208 has been deleted by the number exceeding the number that can be registered (YES in step S809), the print control unit 202 causes the process proceed to the automatic registration process (i.e., step S810). On the other hand, if the print control unit 202 determines that paper information registered in the paper information storage unit 208 has not been deleted (NO in step S809), the print control unit 202 causes the process to return to step S802. In step S811, the print control unit 202 cancels the print job, and the process ends.

If the user has selected cancelling the job on the interface unit 204, the print control unit 202 causes the process to proceed from step S806 to step S811, and the print control unit 202 cancels the print job, and the process ends. Further, if the user has not selected cancelling the job and has selected one of the paper types displayed in step S804, the print control unit 202 deletes from the paper information storage unit 208 the paper information of the paper type selected in step S808. The processes performed in step S802 to step S808 are then repeated until the paper information registered in the paper information storage unit 208 has been deleted by the number equivalent to the number exceeding the number that can be registered. The print control unit 202 causes the process to proceed to step S810, i.e., the automatic registration process.

Figure 9:
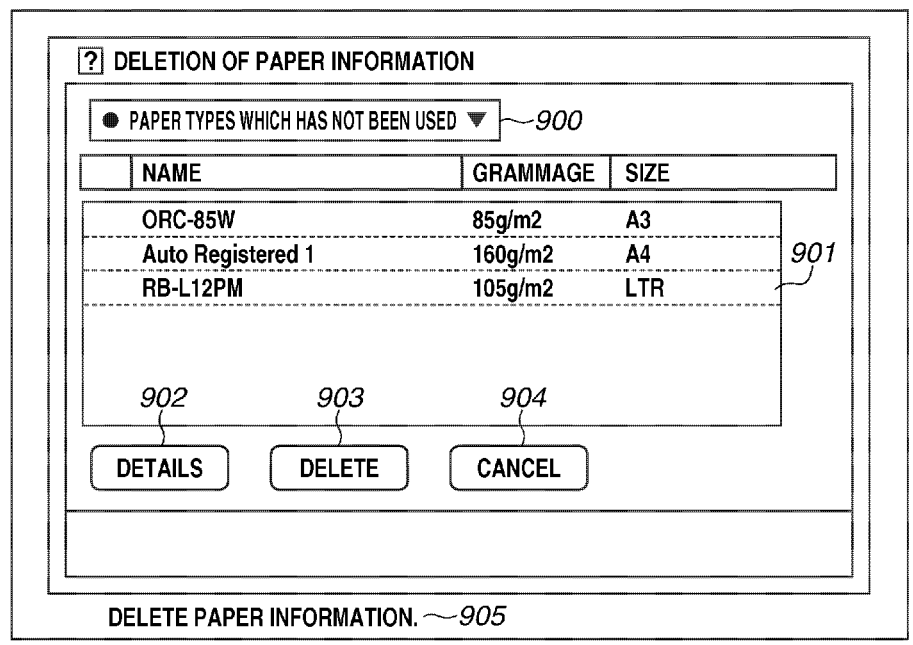
FIG. 9 illustrates an example of a screen.

FIG. 9 illustrates an example of the screen displayed in step S804 of the flowchart illustrated in FIG. 8. Referring to FIG. 9, a pull-down menu 900 is used for switching the paper types to be displayed. The pull-down menu 900 allows the user to switch between displaying the paper types in the paper information which has not been used for more than one month generated in step S803, and the paper types in all of the paper information that has been registered. A display area 901 displays the list of the paper types, and the information for distinguishing the paper types, such as the names of the paper types. Further, the display area 901 allows the user to select the paper type displayed in the list.

A details button 902 and a delete button 903 are UI which the user can select while selecting the paper type. The details button 902 is a UI for displaying detailed information on the selected paper type. The delete button 903 is a UI for deleting the paper information of the selected paper type. If the user deletes the paper information of the paper type exceeding the number that can be registered, the automatic registration process is performed. A cancel button 904 is a UI for receiving cancelling of the print job. A display area 905 displays as a message that it is necessary to delete the paper information of the paper type. If it is necessary to delete a plurality of paper information, the display area 905 may also display the number of paper information necessary to be deleted.

Figure 10:
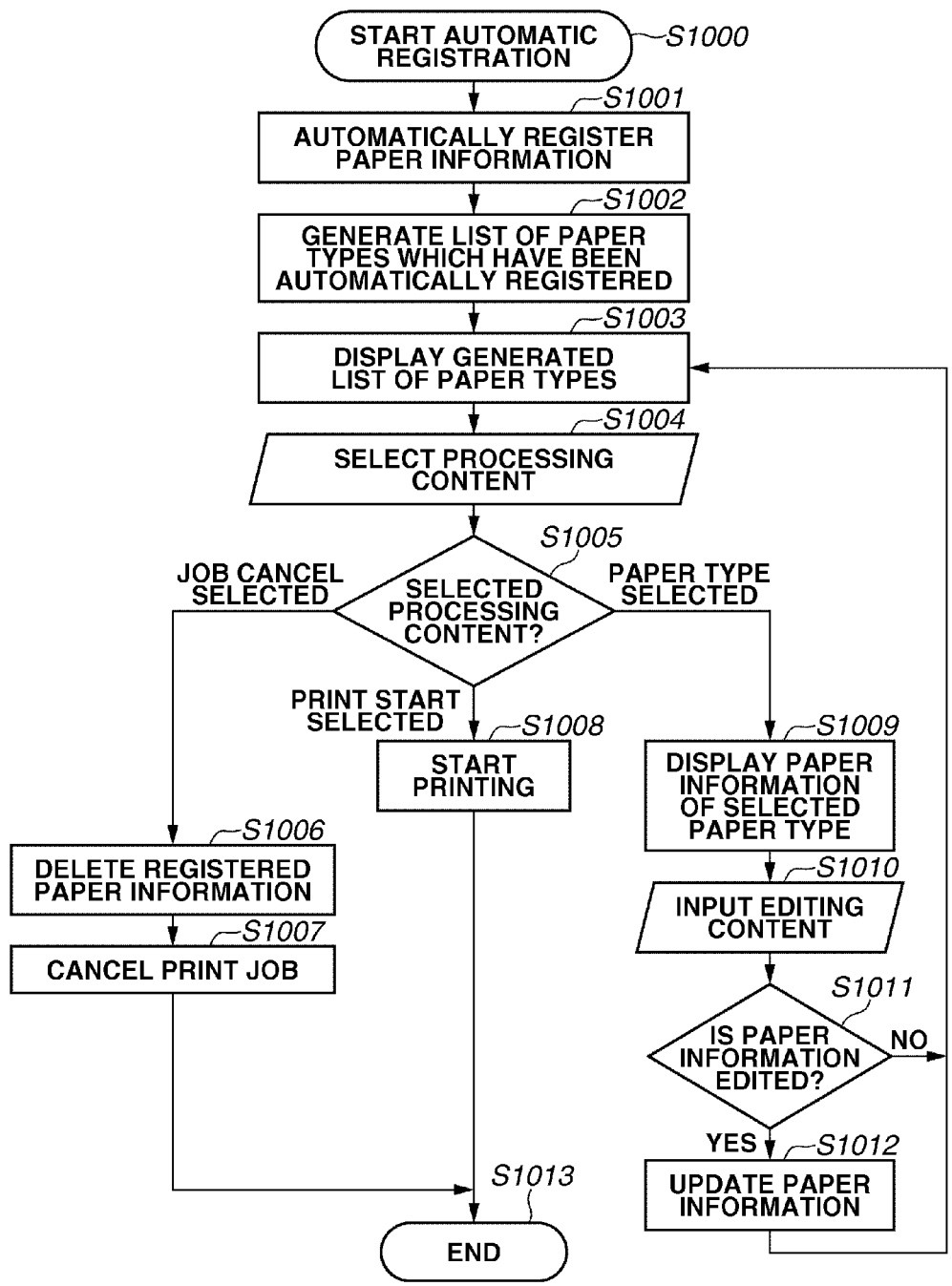
FIG. 10 is an example of a flowchart illustrating an automatic registration process.

FIG. 10 is an example of a flowchart illustrating the automatic registration process. According to the example illustrated in FIG. 10, all of the paper types of the registered paper information is displayed and becomes editable.

In step S1001, the print control unit 202 registers the paper information in the paper information storage unit 208 via the paper information management unit 207. Specifically, the print control unit 202 registers, among the paper information designated by the print job, the paper information not registered in the printing apparatus 102. In other words, the print control unit 202 collectively registers in step S1001 all of the paper information to be automatically registered.

In step S1002, the print control unit 202 generates the list of the paper types included in all of the paper information registered in step S1001. In step S1003, the print control unit 202 displays via the display content control unit 205 the generated list on the interface unit 204. The interface unit 204 displays the information for the paper types, such as the name of the paper type. Further, the interface unit 204 also displays the buttons for cancelling the print job and selecting print start.

In step S1004, the interface unit 204 receives a user selection of the processing content. More specifically, the user selects on the interface unit 204, displaying the details of the selected paper type among the paper types displayed in step S1003, cancelling the print job, or starting printing. In step S1005, the print control unit 202 causes the process to branch according to the selected content. More specifically, if the print control unit 202 determines in step S1004 that the user has selected cancelling the job (JOB CANCEL SELECTED in step S1005), the process proceeds to step S1006. If the print control unit 202 determines in step S1004 that the user has selected starting printing (PRINT START SELECTED in step S1005), the process proceeds to step S1008. If the print control unit 202 determines in step S1004 that the user has selected the paper type (PAPER TYPE SELECTED in step S1005), the process proceeds to step S1009.

In step S1006, the print control unit 202 deletes, from the paper information storage unit 208 via the paper information management unit 207, all of the paper information automatically registered in step S1001. In step S1007, the print control unit 202 cancels the print job, and the process ends. In step S1008, the print control unit 202 starts printing, and when printing is completed, the process ends.

In step S1009, the print control unit 202 displays, on the interface unit 204 via the display content control unit 205, the screen indicating the details of the paper information of the selected paper type. The user can change on the screen the setting values of each item in the paper information. In step S1010, the interface unit 204 receives input of the editing content. In step S1011, the print control unit 202 determines whether the paper information has been edited. If the print control unit 202 determines that the paper information has been edited (YES in step S1011), the print control unit 202 proceeds to step S1012. On the other hand, if the print control unit 202 determines that the paper information has not been edited (NO in step S1011), the print control unit 202 proceeds to step S1013 without updating the paper information.

In step S1012, the print control unit 202 updates the paper information via the paper information management unit 207. The print control unit 202 returns to step S1003. The setting values of the items that can be edited may include the setting values of the items such as a paper feed tray to which the paper type is to be assigned (registered).

Figure 11:
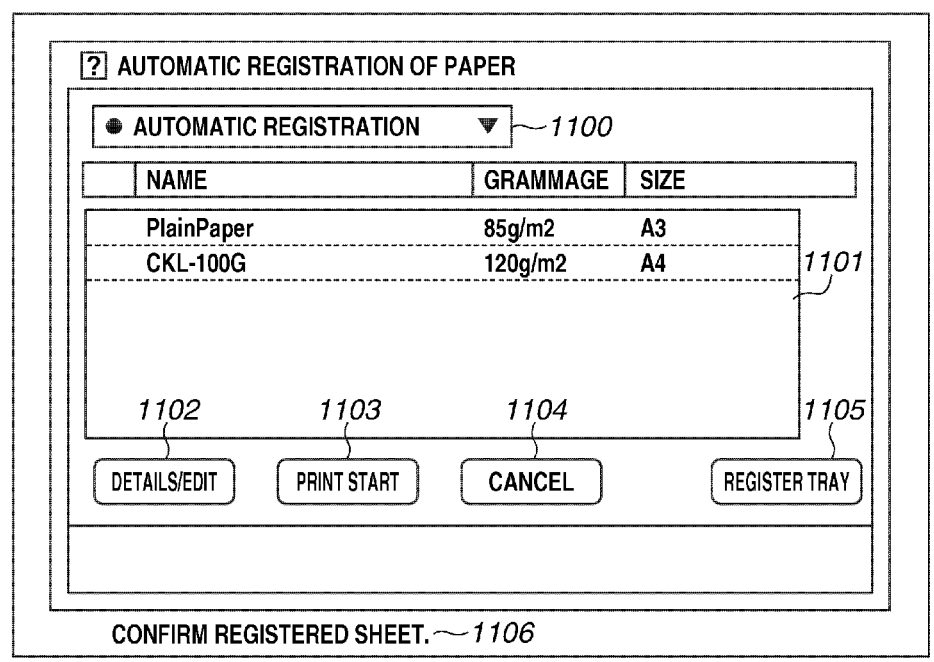
FIG. 11 illustrates an example of the screen.

FIG. 11 illustrates an example of the screen displayed in step S1003 illustrated in FIG. 10. Referring to FIG. 11, a pull-down menu 1100 is used for switching the paper types to be displayed. The user can switch, using the pull-down menu 1100, between displaying only the paper types of the paper information which is automatically registered in step S1001, and displaying the paper types of all of the registered paper information. A display area 1101 displays the paper types. More specifically, the display area 1101 displays the information, by which the paper type can be distinguished, such as the names of the paper types. A details/edit button 1102 is a UI for transiting to a details/editing screen of the paper information. If the user presses the details/edit button 1102 while selecting a paper type in the display area 1101, the process jumps to step S1009 in the flowchart illustrated in FIG. 10, and the details/edit screen is displayed.

A print start button 1103 is a UI for starting printing. If the user presses the print start button 1103, the process transits to step S1008 in the flowchart illustrated in FIG. 10, and printing is started. A cancel button 1104 is a UI for cancelling the print job. If the user presses the cancel button 1104, the process transits to step S1006 in the flowchart illustrated in FIG. 10, and the print job is cancelled. A tray registration button 1105 is a UI for assigning the paper type to the tray. The user can assign the paper type selected in the display area 1101 to the designated tray. The tray registration button 1105 may be included in the details/edit screen displayed by the user pressing the details/edit button 1102. A display area 1106 displays a status message, and displays a message prompting the user to confirm the paper information which has been automatically registered.

Figure 12:
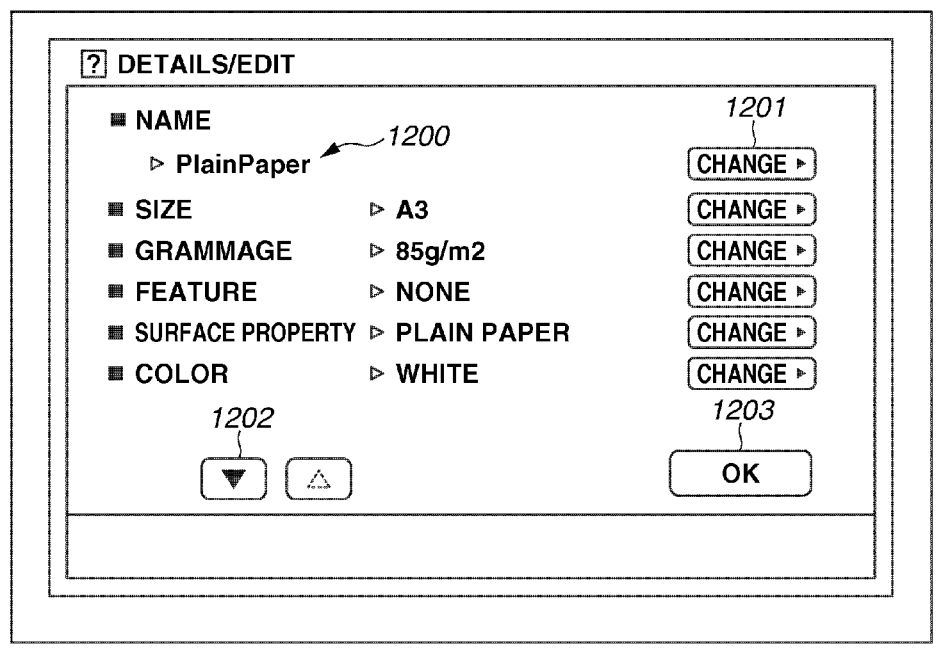
FIG. 12 illustrates an example of the screen.

FIG. 12 illustrates an example of the screen (i.e., the details/edit screen) displayed in step S1009 of the flowchart illustrated in FIG. 10 when the user presses the details/edit button 1102 in the screen illustrated in FIG. 11. Referring to FIG. 12, a setting value display area 1200 displays the name of the paper type (i.e., the setting value). The user can change the name of the paper type by pressing a change button 1201. The setting value display area 1200 similarly displays the setting values with respect to the size, grammage, the feature, the surface property, and the color. The user can thus change the setting values by pressing the change button. According to the present exemplary embodiment, the paper information is not limited to those illustrated in FIG. 12. For example, if the user presses a next button 1202, the setting values of other items are displayed. When the user finishes editing and presses an OK button 1203, the change is reflected, and the screen transits to the screen illustrated in FIG. 11.

FIG. 13 is another example of a flowchart illustrating the automatic registration process. According to the example illustrated in FIG. 13, if the automatically registered paper information includes a setting value that cannot be used in the printing apparatus 102, only the paper type of such paper information is displayed. A setting value (sheet) which cannot be actually used by the printing apparatus 102 may be designated in the paper information. If such a setting value is designated, the paper information is automatically registered by rounding off (adjusting) the setting value so that the paper information can be registered. It is thus necessary for the user to confirm and change the content of the registration with regards to such paper information.

In step S1301, the print control unit 202 registers via the paper information management unit 207 the paper information in the paper information storage unit 208. The print control unit 202 registers the paper information not registered in the printing apparatus 102 among the paper information designated in the print job. In other words, the print control unit 202 collectively registers in step S1301 all of the paper information which is to be automatically registered.

In step S1302, the print control unit 202 determines whether there is paper information which has been registered by rounding off the setting value in performing automatic registration. If the print control unit 202 determines that there is no such paper information (NO in step S1302), the print control unit 202 proceeds to step S1307. If the print control unit 202 determines that there is at least one of such paper information (YES in step S1302), the print control unit 202 proceeds to step S1303. In step S1303, the print control unit 202 generates a list of the paper types of the paper information which has been registered by rounding off the setting value. In step S1304, the print control unit 202 displays the generated list on the interface unit 204 via the display content control unit 205. The interface unit 204 displays the information for distinguishing the paper types, such as the names of the paper types. Further, the interface unit 204 also displays the buttons for cancelling the print job and selecting print start.

In step S1305, the interface unit 204 receives the user selection of the processing content. More specifically, the user selects on the interface unit 204, displaying the details of the selected paper type among the paper types displayed in step S1304, cancelling the print job, or starting printing. In step S1306, the print control unit 202 causes the process to branch according to the selected content. More specifically, if the print control unit 202 determines that the user has selected starting printing in step S1305 (PRINT START SELECTED in step S1305), the print control unit 202 proceeds to step S1307. If the print control unit 202 determines that the user has selected cancelling the job (JOB CANCEL SELECTED in step S1305), the print control unit 202 proceeds to step S1308. If the print control unit 202 determines that the user has selected a paper type (PAPER TYPE SELECTED in step S1305), the print control unit 202 proceeds to step S1311.

In step S1307, the print control unit 202 starts printing, and when printing is completed, the process ends. In step S1308, the print control unit 202 deletes from the paper information storage unit 208 via the paper information management unit 207 all of the paper information which has been automatically registered in step S1301. In step S1309, the print control unit 202 cancels the print job, and the process ends.

In step S131, the print control unit 202 displays the screen indicating the detailed paper information of the selected paper type. The user can change on the screen the setting value of each item in the paper information. In step S1312, the interface unit 204 receives input of the editing content. In step S1313, the print control unit 202 determines whether the paper information has been edited. If the print control unit 202 determines that the paper information has been edited (YES in step S1313), the print control unit 202 proceeds to step S1314. If the print control unit 202 determines that the paper information has not been edited (NO in step S1313), the print control unit 202 returns to step S1304 without updating the paper information. In step S1314, the print control unit 202 updates the paper information via the paper information management unit 207. The process then returns to step S1304. The setting values of the items that can be edited may include the setting values of the items such as the paper feed tray to which the paper type is to be assigned.

As described above, the printing apparatus 102 analyzes, before starting printing, the input print job, and determines whether all of the paper information to be automatically registered can be registered, based on the analysis result. If all of the paper information can be registered, the printing apparatus 102 collectively performs the automatic registration process before starting printing and displays the automatically registered paper information, so that the user can edit the paper information. As a result, it prevents an operation from generating due to automatic registration being performed during printing. Further, whether the registration number will reach the upper limit is previously determined. It thus prevents unnecessary printing and cost due to the registration number reaching the upper limit while performing the print job, so that the print job becomes cancelled and the acquired printed output becomes wasted.

According to the above-described exemplary embodiment, if the paper information of the paper to be used in printing has not been registered, registration of the paper information and printing can be more appropriately controlled.

Other Embodiments

Aspects of the present invention can also be realized by a computer of a system or apparatus (or devices such as a CPU or a micro-processing unit (MPU) which may also be referred to as a microprocessor) that reads out and executes a program recorded on a memory device (computer-readable medium) to perform the functions of one or more of the above-described embodiments, and by a method, the steps of which are performed by a computer of a system or apparatus by, for example, reading out and executing the program recorded on the memory device to perform the functions of one or more of the above-described embodiments. For this purpose, the program can be provided to the computer for example via a network or from a recording medium of various types serving as the memory device (e.g., non-transitory computer-readable medium). In such a case, the system or apparatus, and the recording medium where the program is stored, are included as being within the scope of the present invention. The computer-readable medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-156737 filed Jul. 15, 2011, which is hereby incorporated by reference herein in its entirety.

What is claimed is:

1. An image forming apparatus which stores, in a storage area, attribute information of a recording medium to be used in printing, the apparatus comprising:
    an acquisition unit configured, before printing print data, to analyze the print data and to acquire attribute information of a recording medium used in printing the print data; and
    a control unit configured, before printing the print data, to determine whether attribute information matching the attribute information acquired by the acquisition unit is stored in the storage area, and configured to register, in the storage area, attribute information not stored in the storage area among the attribute information acquired by the acquisition unit,
    wherein the control unit is configured, if the control unit determines that the attribute information can be stored in the storage area by comparing the number of attribute information acquired by the acquisition unit and the number of attribute information which can be stored in the storage area, to perform the registration, and
    wherein the control unit is configured, if the control unit determines that the attribute information cannot be stored in the storage area, to cancel printing of the print data.

2. The image forming apparatus according to claim 1, wherein the control unit is configured, if the control unit determines that the attribute information cannot be stored in the storage area, to delete attribute information which is designated by a user operation among the attribute information stored in the storage unit.

3. The image forming apparatus according to claim 1, wherein the control unit is configured, if the control unit determines that the attribute information cannot be stored in the storage area, to register attribute information not stored in the storage area among the attribute information acquired by the acquisition unit, in other storage area(s) different from the storage area.

4. The image forming apparatus according to claim 3, wherein the control unit is configured, if the control unit deletes attribute information from the storage area, to copy the attribute information stored in the other storage area to the storage area, and deletes the attribute information which is copied from the other storage area(s).

5. The image forming apparatus according to claim 1, further comprising a reception unit configured to receive a user operation for editing, when the control unit registers attribute information, the attribute information.

6. The image forming apparatus according to claim 5, wherein the reception unit is configured to determine whether there is attribute information which is adjusted to be registerable among attribute information registered by the control unit, and to receive a user operation for editing the attribute information adjusted to be registerable.

7. The image forming apparatus according to claim 5, wherein the reception unit is configured to receive a user operation for starting printing of print data in which the attribute information has been acquired, and a user operation for cancelling printing of the print data.

8. A control method in an image forming apparatus which stores in a storage area, attribute information of a recording medium to be used in printing, the method comprising:
    analyzing, before printing print data, the print data and acquiring attribute information of a recording medium used in printing the print data; and
    determining, before printing the print data, whether attribute information matching the acquired attribute information is stored in the storage area, and registering in the storage area attribute information not stored in the storage area among the acquired attribute information,
    wherein, if the determining determines that the attribute information can be stored in the storage area by comparing the number of attribute information acquired by the acquisition unit and the number of attribute information which can be stored in the storage area, the registration is performed, and
    wherein, if the determining determines that the attribute information cannot be stored in the storage area, printing of the print data is cancelled.

9. A non-transitory computer-readable storage medium storing program for causing a computer to function as a control unit comprising:
- an acquisition unit configured to analyze, before printing print data, the print data and to acquire attribute information of a recording medium used in printing the print data; and
- a control unit configured, before printing the print data, to determine whether attribute information matching the attribute information acquired by the acquisition unit is stored in the storage area, and configured to register, in the storage area, attribute information not stored in the storage area among the attribute information acquired by the acquisition unit,
- wherein the control unit is configured, if the control unit determines that the attribute information can be stored in the storage area by comparing the number of attribute information acquired by the acquisition unit and the number of attribute information which can be stored in the storage area, to perform the registration, and
- wherein the control unit is configured, if the control unit determines that the attribute information cannot be stored in the storage area, to cancel printing of the print data.

* * * * *